Figure 1:
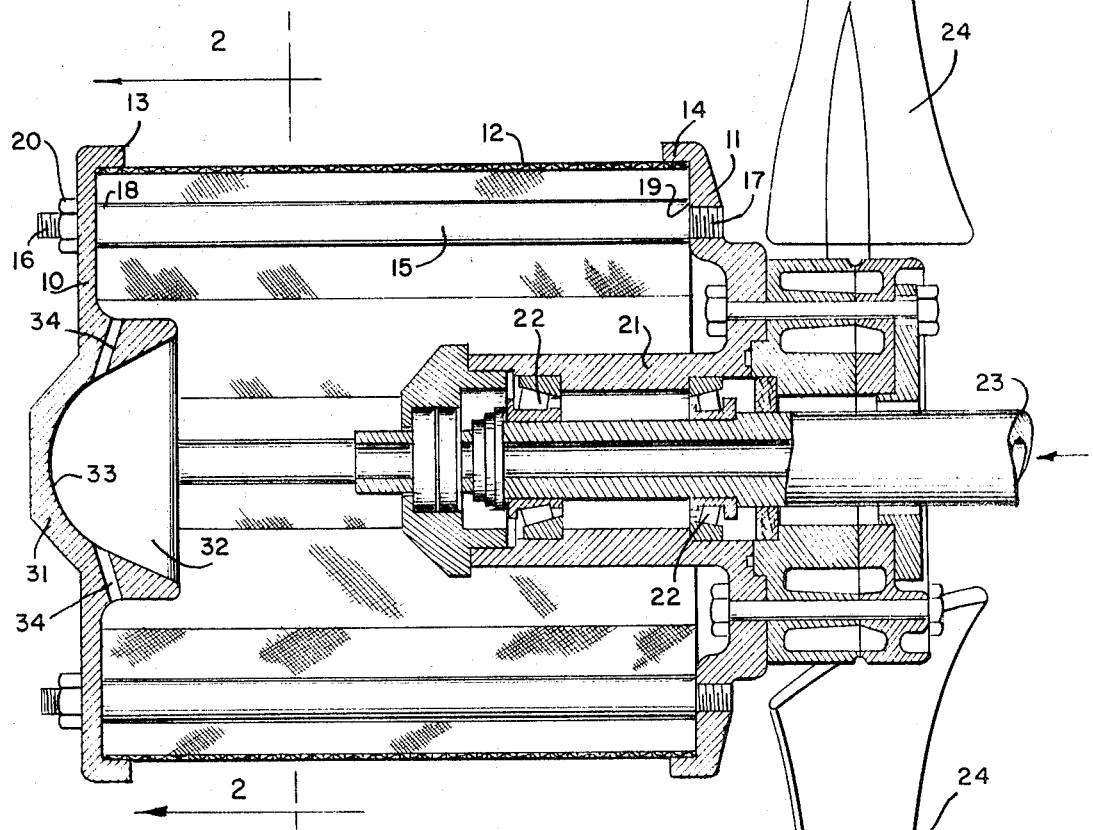
Figure 2:
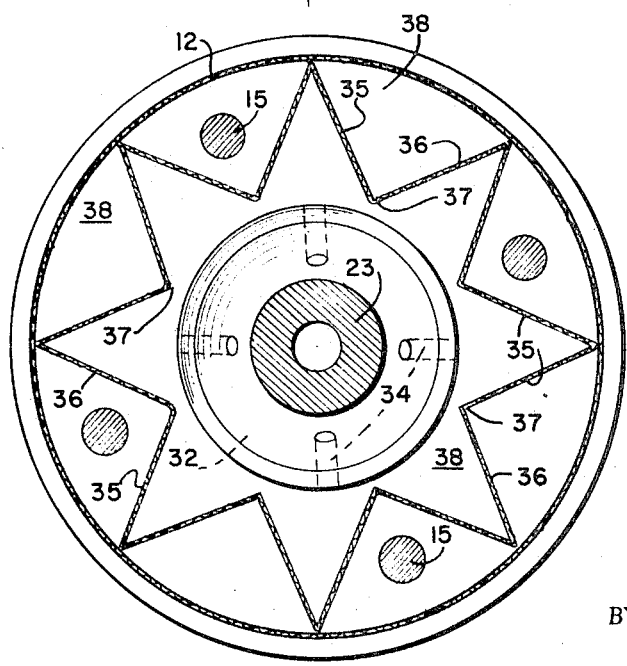
Figure 3:
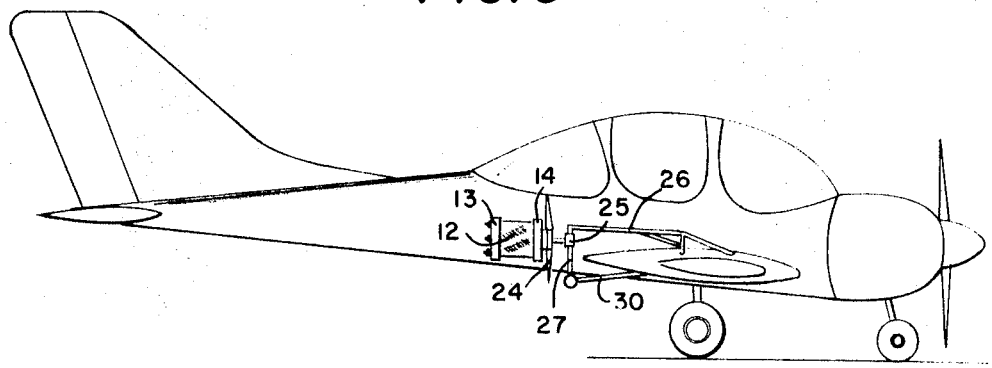
Figure 4:
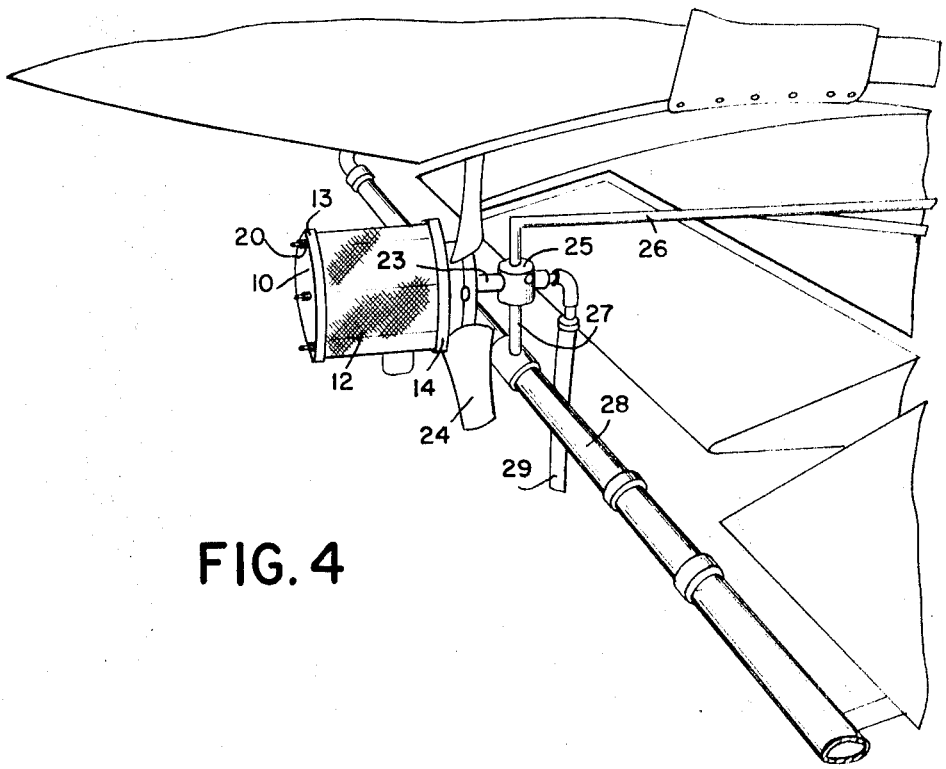

United States Patent

[11] 3,589,613

| [72] | Inventor | John S. Saladin |
| | | 400 Farm, Rte #1, Easton, Md. 21601 |
| [21] | Appl. No. | 817,380 |
| [22] | Filed | Apr. 18, 1969 |
| [45] | Patented | June 29, 1971 |

[54] DEVICE FOR FERTILIZING AND/OR PEST CONTROL OF CROPS
3 Claims, 4 Drawing Figs.

[52] U.S. Cl. ................................................ 239/141,
239/171, 239/222, 239/590.3, 244/136, 261/75
[51] Int. Cl. ........................................................ B05b 17/02
[50] Field of Search............................................ 239/7, 14,
140, 141, 171, 214, 222, 246, 590.3; 244/136;
169/15; 261/75

[56] References Cited

UNITED STATES PATENTS

| 2,979,269 | 4/1961 | Bals............................ | 239/222 X |
| 2,986,338 | 5/1961 | Foster........................ | 239/222 |
| 2,992,778 | 7/1961 | Martin........................ | 239/223 |
| 3,393,745 | 7/1968 | Durstewitz................. | 239/222 X |
| 3,398,893 | 8/1968 | Missimer et al............ | 244/136 X |

FOREIGN PATENTS

| 622,123 | 4/1930 | Germany..................... | 239/222 |

Primary Examiner—M. Henson Wood, Jr.
Assistant Examiner—Michael Y. Mar
Attorney—Wilkinson, Mawhinney & Theibault ABSTRACT: A rotating drum has a foraminous (wire mesh screen) cylindrical outer wall and inner foraminous panels zigzagged circularly around inside the drum adjacent the cylindrical outer wall and forming therewith a circular succession of cells into which fluid pesticide, fluid fertilizer or the like is admitted through the meshes of the panels and thence through meshes of the outer wall to atomize and break up the fluid into minute droplets or vapor, provision being made for automatically rotating the drum incident to movement of the airplane or other vehicle carrying the apparatus thereby causing the foraminous panels to cut through the fluid material supplied to the drum by an injection nozzle from a pressure source of fluid supply injected into the drum against a target having a frustoconical or parabolic (or hyperbolic) bowl adapted to reflect the incident stream in a conical sheet outwardly toward the foraminous panels and cylindrical outer wall and through the openings or meshes of the panels and outer wall in the form of minute droplets and vapor to the outside atmosphere for settling on the growing crops.

INVENTOR

JOHN S. SALADIN

BY Wilkinson, Mawhinney and Thiebault
ATTORNEYS

INVENTOR

JOHN S. SALADIN

BY Wilkinson, Mahhinney and Thielsoult
ATTORNEYS

DEVICE FOR FERTILIZING AND/OR PEST CONTROL OF CROPS

The present invention relates to a DEVICE FOR FERTILIZING AND/OR FOR PEST CONTROL OF CROPS and has for an object to provide a device adapted to be mounted on an airplane or other vehicle moving through an agricultural area by which pesticide or fertilizer may be atomized and distributed to the crops.

Another object of the invention is to provide a rotary device for receiving liquid material which will facilitate the dissemination of beneficial crop assists in droplet and suspended vapor form well calculated to settle over wide areas of the growing plants to eradicate pests and promote healthy crop growth.

With the foregoing and other objects in view, the invention will be more fully described hereinafter, and will be more particularly pointed out in the claims appended hereto.

In the drawings, wherein like symbols refer to like or corresponding parts throughout the several views:

FIG. 1 is a longitudinal sectional view taken axially through the rotary drum and its support including the driving propellers which activate the device.

FIG. 2 is a cross section taken on the line 2–2 in FIG. 1.

FIG. 3 is a side elevational view illustrating a manner of application of the device to an airplane.

FIG. 4 is an enlarged fragmentary perspective view showing a closeup of the device and associated parts of the plane.

Referring more particularly to the drawings and for the present to FIGS. 1 and 2, a rotary drum is provided comprising generally the end heads 10 and 11 and the outer foraminous cylindrical wall 12, which is preferably of wire mesh of small gauge. Outer end portions or clamps 13 and 14 of the drum heads 10 and 11 are inturned to overlie edge portions of the cylindrical wall 12.

The heads 10 and 11 may be clamped to opposite ends of the wall 12 by rods 15 having reduced threaded ends 16 and 17, the reductions in diameter forming shoulders 18 and 19 which abut respectively inner surfaces of the end heads 10 and 11 and restrict the closing movements of the heads 10 and 11 on the drum outer wall 12. The threaded ends 17 are screwed into correspondingly threaded holes in the end head 11 while nuts 20 run on the threaded ends 16 of the rods 15 push the end head 10 against the shoulders 18. The shoulders 18 and 19 restrict the inward movements of the two end heads 10 and 11. The drum may be otherwise fabricated as the same is no part of the invention except as it provides the outer wall 12, preferably cylindrical, and foraminous at least partially.

The drum is supported for rotation by a sleeve 21 integral with or affixed to the head 11 and extending into the drum, the sleeve being supported on roller or other bearings 22 which in turn are supported on a fluid induction tube 23 by which pesticide, liquid fertilizer or other crop-treating material, may be introduced under suitable pressure into the drum from an external source of supply mounted in an appropriate location on the airplane or other vehicle.

Affixed also to the head 11 but externally of the drum is a rotary motor of appropriate type: in the instance illustrated being propeller blades 24 for windmilling when the airplane is airborne.

The device may be supported through the induction tube 23 from a valve head 25 or other part by means of an overhead strut 26 and underlying post 27 erected on a tubular member 28. The strut 26 and tubular member 28 are affixed to the fuselage or other stable parts of the plane.

The pesticide, liquid fertilizer or other treatment material in liquid form is fed to the tube or nozzle 23 from a source of the material under pressure from a feed pipe 29. In FIG. 3, a lower strut 30 is shown cooperating with the upper strut 26 to stabilize the device.

As shown in FIG. 1, the drum head 10 supports a target member 31 having an internal bowl 32 of a generally frustoconical form opening at its base inwardly toward the fluid induction tube or nozzle 23 with the preferably rounded apex portion 33 in substantial alignment with the nozzle 23. The rounded portion may be of the order of a parabola. Breather openings 34 are made through the periphery of the bowl to break any tendency to vacuum spots in the internal space of the bowl. The discharge end of the nozzle 23 is spaced substantially from the bowl including the inner rim portion to allow for the fanning out of the liquid sheet in hollow cone form and the direction of the liquid under substantial force into the internal chamber of the drum where the sheet and the liquid as a whole encounter the atomizing members 35 and 36, shown to best advantage in FIG. 2.

These members 35 and 36 are shown to be flat foraminous panels, like the cylindrical drum wall 12 preferably of wire mesh screen. One such panel is efficacious, but the panels are preferably mounted in pairs and, if desired, such panel pairs may be continued around the complete circle of the drum and the number of pairs will depend on the size of the individual panels, the angularity at which they are disposed relatively to the circle of the drum outer wall, the breadth of the panels and the angular association of the pairs.

For instance, the plane of the panel 35 intersects the circle of the drum outer wall and the plane of the panel is nonradial. The second companion panel 36 is affixed in the drum in a plane intersecting both the circle of the drum outer foraminous wall 12 and the plane of the companion panel 35. Both panels cross radii of the circle of the drum in relatively opposite directions and meet at 37 at the inner edges of the two panels forming an enclosed cell 38 bounded on two sides by the panels 35 and 36 and on the third side by the curved arc of the outer wall 12 subtended by the angle of meeting at the inner portions of the two panels.

The panels are preferably of round wire screen mesh. The round cross sections of the numerous wires at the great numbers of small meshes offers smooth curved walls to the liquid, thus promoting ease of passage of the fluid into and through the meshes and the division of the fluid into tiny droplets assuming on liberation from the screen wall 12 of the drum a cloudlike dispersion which floats in the atmosphere for a time and finally settles over an extensive area of the crops.

In operation, the liquid material will enter under substantial pressure through the central nozzle or fluid induction tube 23, strike the target bowl and be reflected outwardly in a substantially thin sheet which is conical in form and directed into a central area of the drum which is being rotated at a rapid rate by the windmilling vanes or propellers. The velocity of the incoming fluid will drive the same against the panel 35 or panel couple 35, 36 and through the apertures therein. At the same time the drum in rotating will cause the foraminous or screen or gauze panels to cut through the sprayed material driving the sprayed material through the meshes or small apertures of the screen or foraminous panels and thus atomizing and subdividing the sprayed material into small droplets which are eventually thrown out by centrifugal force through the meshes of the outer cylindrical screen covering of the drum.

Due to the rapid rotation of the drum, the sprayed material will be forced through the small openings in several successive panels 35, 36 before being ejected outwardly of the drum. By this successive action the sprayed material is converted into extremely small droplets, is thus atomized and is discharged from the drum in a cloud or vapor pattern which permits the finely divided material to be suspended in the ambient atmosphere and to slowly settle down over a wide expanse of the crop field. In passing through the panels 35, the material will enter the cells from which a substantial portion will be driven through the companion panels 36 and thence through successive panels into successive cells 38, undergoing division and atomization and finally will be discharged through the drum wall axially outwardly into the surrounding atmosphere.

Although substantial and satisfactory results may be had with a single panel 35 or 36, the combination of the cells of panels 35 and 36 enclosing the cells 38 will yield maximum results particularly when these panel and cell formations are repeated all around the center of the drum.

Due to the relationship between the target bowl, nozzle and drum, the liquid entering the nozzle will be quickly converted in large quantities to droplet-cloud formation when issuing from the drum into the ambient atmosphere.

What I claim is:

1. In a device for the purposes described
   a. a drum mounted for rotation on a vehicle adapted to traverse a field under cultivation and having,
   b. at least a partially foraminous outer wall,
   c. a first foraminous panel affixed in the drum in a plane intersecting the outer wall,
   d. a second companion foraminous panel affixed in the drum in a plane intersecting both the circle of the drum outer wall and the plane of the first-named panel,
   e. means for introducing into the drum a crop-treating fluid material, and
   f. means for rotating the drum to cause the panels to cut through the fluid material for atomizing and subdividing the fluid material and incidentally for generating centrifugal force in the fluid material for driving the fluid material through the apertures of both panels and the foraminous outer drum wall and into the surrounding atmosphere.

2. A device according to claim 1 in which the two panels cross angularly displaced radii of the circle of the drum in relatively opposite directions and meet at the inner portions of the panels forming an enclosed cell bounded on two sides by the two panels and on the third side by the curved arc of the outer wall subtended by the angle of meeting at the inner portions of the two panels.

3. The device as claimed in claim 2 in which the panels and cell structure are repeated around the circle of the drum.